United States Patent
Mitsumoto et al.

(10) Patent No.: US 9,893,355 B2
(45) Date of Patent: Feb. 13, 2018

(54) SPINEL-TYPE LITHIUM MANGANESE TRANSITION METAL OXIDE

(71) Applicant: Mitsui Mining & Smelting Co., Ltd., Tokyo (JP)

(72) Inventors: Tetsuya Mitsumoto, Takehara (JP); Hitohiko Ide, Takehara (JP); Shinya Kagei, Takehara (JP); Yoshimi Hata, Takehara (JP); Natsumi Shibamura, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 277 days.

(21) Appl. No.: 14/368,635

(22) PCT Filed: Dec. 27, 2012

(86) PCT No.: PCT/JP2012/083920
§ 371 (c)(1),
(2) Date: Jun. 25, 2014

(87) PCT Pub. No.: WO2013/100070
PCT Pub. Date: Jul. 4, 2013

(65) Prior Publication Data
US 2014/0353547 A1    Dec. 4, 2014

(30) Foreign Application Priority Data
Dec. 27, 2011  (JP) .................... 2011-284959

(51) Int. Cl.
*H01M 4/505* (2010.01)
*C01G 53/00* (2006.01)

(52) U.S. Cl.
CPC ............ *H01M 4/505* (2013.01); *C01G 53/50* (2013.01)

(58) Field of Classification Search
CPC ....... H01M 4/505; C01G 53/50; Y02E 60/122
USPC .......................................... 252/500
See application file for complete search history.

(56) References Cited

U.S. PATENT DOCUMENTS

| | | | |
|---|---|---|---|
| 6,325,988 B1 * | 12/2001 | Inoue | C01G 45/1242 423/599 |
| 2003/0091900 A1 * | 5/2003 | Numata | C01G 45/1242 429/224 |
| 2011/0223483 A1 | 9/2011 | Koga et al. | |
| 2012/0012776 A1 * | 1/2012 | Kagei | C01G 45/1242 252/62.51 R |

FOREIGN PATENT DOCUMENTS

| | | |
|---|---|---|
| JP | 11-045710 | 2/1999 |
| JP | 2001-122626 | 5/2001 |
| JP | 2001-176503 | 6/2001 |

(Continued)

*Primary Examiner* — Mark Kopec
*Assistant Examiner* — Danny N Kang
(74) *Attorney, Agent, or Firm* — The Webb Law Firm (57) ABSTRACT

Provided is a new spinel type lithium manganese transition metal oxide for use in lithium batteries, which can increase the capacity retention ratio during cycling, and can increase the power output retention ratio during cycling. Disclosed is a spinel type lithium manganese transition metal oxide having an angle of repose of 50° to 75°, and having an amount of moisture (25° C. to 300° C.) measured by the Karl Fischer method of more than 0 ppm and less than 400 ppm.

15 Claims, 2 Drawing Sheets

(56) References Cited

FOREIGN PATENT DOCUMENTS

| | | | |
|---|---|---|---|
| JP | 2001-325960 | | 11/2001 |
| JP | 2002-033101 | | 1/2002 |
| JP | 2002-068745 | | 3/2002 |
| JP | 2002068745 A | * | 3/2002 |
| JP | 3456181 | | 8/2003 |
| JP | 2010-108926 | | 5/2010 |
| WO | 2010/114015 A1 | | 10/2010 |

* cited by examiner

SPINEL-TYPE LITHIUM MANGANESE TRANSITION METAL OXIDE

CROSS-REFERENCE TO RELATED APPLICATIONS

This application is the United States national phase of International Application No. PCT/JP2012/083920 filed Dec. 27, 2012, and claims priority to Japanese Patent Application No. 2011-284959 filed Dec. 27, 2011, the disclosures of which are hereby incorporated in their entirety by reference.

TECHNICAL FIELD

The present invention relates to a spinel type lithium manganese transition metal oxide which can be used as a positive electrode active material for lithium batteries, and particularly, which can be suitably used as a positive electrode active material for batteries that are mounted in electric vehicles (EV), hybrid electric vehicles (HEV), and the like.

BACKGROUND ART

Lithium batteries, particularly lithium secondary batteries, have features such as high energy density and long life, and therefore, lithium batteries are widely used as power supplies for electric appliances such as video cameras, portable electronic devices such as laptop computers and mobile telephones, electric tools such as power tools, and the like. Recently, lithium batteries are also applied to large-sized batteries that are mounted in electric vehicles (EV), hybrid electric vehicles (HEV), and the like.

A lithium secondary battery is a secondary battery having a structure in which, at the time of charging, lithium begins to dissolve as ions from the positive electrode and moves to the negative electrode to be stored therein, and at the time of discharging, lithium ions return from the negative electrode to the positive electrode, and it is known that the higher energy density of the lithium secondary battery is attributable to the electric potential of the positive electrode material.

Regarding positive electrode active material for lithium secondary batteries of this kind, there are known lithium transition metal oxides having layered structures, such as $LiCoO_2$, $LiNiO_2$, and $LiMnO_2$; and lithium transition metal oxides having a manganese-based spinel structure (Fd-3 m) (in the present invention, also referred to as "spinel type lithium transition metal oxide" or "LMO"), such as $LiMn_2O_4$ and $LiNi_{0.5}Mn_{1.5}O_4$.

Manganese-based spinel type lithium transition metal oxides (LMO) are produced from inexpensive raw materials, are non-toxic and safe, and have properties highly tolerant to overcharging, and therefore, attention has been paid thereto as the next-generation positive electrode active materials for large-sized batteries for electric vehicles (EV), hybrid electric vehicles (HEV), and the like. Also, since spinel type lithium transition metal oxides (LMO) that are capable of three-dimensional insertion and release of Li ions, have superior power output characteristics compared with lithium transition metal oxides having a layered structure, such as $LiCoO_2$, the spinel type lithium transition metal oxides are expected to be useful in applications where excellent power output characteristics are required, such as batteries for EV and batteries for HEV.

In regard to spinel type lithium transition metal oxides (LMO), for example, a lithium manganese composite oxide represented by composition formula: $Li_{1+x}Mn_{2-x}O_{u-y}F_y$ (wherein $0.02 \leq x$, $0.1 \leq y \leq u$, $3 \leq (2u-y-1-x)/(2-x) \leq 4$, and $3.9 \leq u \leq 4.1$), having an average particle size in the range of 1 μm to 20 μm, has been heretofore disclosed in Patent Document 1.

Furthermore, Patent Document 2 discloses a Li—Mn-based spinel compound represented by composition formula: $Li_{1+x}Mn_{2-x-y}Mg_yO_4$ (x=0.03 to 0.15 and y=0.005 to 0.05), having a specific surface area of 0.5 m²/g to 0.8 m²/g, and a sodium content of 1000 ppm or less.

Patent Document 3 discloses, as a lithium manganese composite oxide having a sharp particle size distribution and high fluidity, a lithium manganese composite oxide represented by formula: $Li_xMn2-yMe_yO4-z$ (wherein Me represents a metal element or transition metal element having an atomic number of 11 or higher, other than Mn; x has a value of $0 < x < 2.0$; y has a value of $0 \leq y < 0.6$; and z has a value of $0 \leq z < 2.0$), having an average particle size of 0.1 μm to 50 μm, an n value based on Rosin-Rammler of 3.5 or more, and a BET specific surface area of 0.1 m²/g to 1.5 m²/g, with 60° or less.

Patent Document 4 discloses a lithium manganese composite oxide obtained by heat treating electrolytic manganese dioxide in an oxygen-containing atmosphere at 400° C. to 900° C., subsequently treating the resultant by washing with water, and then calcining the product together with a lithium compound, characterized in that the lithium manganese composite oxide has a sulfur content of 0.32% by weight or less and an average pore diameter of 120 nm or more, and is represented by formula: $Li_{1+x}Mn_{2-x}O_4$ ($0.032 \leq x \leq 0.182$).

CITATION LIST

Patent Document

Patent Document 1: Japanese Patent Application Laid-Open (JP-A) No. 11-045710
Patent Document 2: JP-A No. 2002-033101
Patent Document 3: JP-A No. 2001-122626
Patent Document 4: Japanese Patent No. 3456181

DISCLOSURE OF THE INVENTION

Problem to be Solved by the Invention

Upon considering a use in a battery mounted in a motor vehicle, for example, a battery that is mounted in an electric vehicle (EV), a hybrid electric vehicle (HEV) or the like, characteristics of both that the life of the battery should be long, in other words, that the capacity retention ratio during cycling should be high, and that the resistance should not increase when the battery is in use, in other words, that the power output retention ratio at the time of cycle should be high, are required. However, it is not easy to increase the capacity retention ratio during cycling, while increasing the power output retention ratio during cycling.

An object of the present invention is to provide a new spinel type lithium transition metal oxide which can have an increased capacity retention during cycling, and can have an increased power output retention ratio during cycling.

SUMMARY OF THE INVENTION

The present invention suggests a spinel type lithium manganese transition metal oxide characterized in that the angle of repose is 50° to 75°, and the amount of moisture (25° C. to 300° C.) measured by the Karl Fischer method is more than 0 ppm and less than 400 ppm.

The present invention succeeded, in relation to a spinel type lithium transition metal oxide, in increasing the power output retention ratio during cycling while increasing the capacity retention ratio during cycling when the lithium transition metal oxide is used as a positive electrode active material for a lithium secondary battery, by controlling the amount of moisture (25° C. to 300° C.) measured by the Karl Fischer method to be less than 400 ppm, and adjusting the angle of repose to a relatively high range. Therefore, the spinel type lithium manganese transition metal oxide proposed by the present invention can be suitably used as a positive electrode active material for a lithium battery, among others, as a positive electrode active material for a battery that is mounted in an electric vehicle (EV), a hybrid electric vehicle (HEV) or the like.

DETAILED DESCRIPTION AND BEST MODE(S) FOR CARRYING OUT THE INVENTION

Next, the present invention will be described by way of exemplary embodiments. However, the present invention is not intended to be limited to the exemplary embodiments that will be described below.

<Present Lithium Transition Metal Oxide>

The spinel type (Fd-3 m) lithium transition metal oxide of the present embodiment (hereinafter, referred to as "present lithium transition metal oxide") is a lithium manganese transition metal oxide characterized in that the metal oxide has an angle of repose in a predetermined range, and the amount of moisture (25° C. to 300° C.) measured by the Karl Fischer method is in a predetermined range.

<Composition>

In regard to the present lithium transition metal oxide, the composition is not particularly limited as long as the oxide has a crystal structure of spinel type (Fd-3 m). It is because, in regard to the effect that the power output retention ratio during cycling can be increased while the capacity retention ratio during cycling is maintained high, by adjusting the amount of moisture (25° C. to 300° C.) measured by the Karl Fischer method and the angle of repose, it is considered that as long as oxide materials have a common crystal structure, the same effect can be obtained even if the oxide materials have different compositions.

However, when the comprehensive characteristics in the case of being used as a positive electrode active material for lithium batteries are considered, a spinel type (Fd-3 m) lithium transition metal oxide represented by general formula (1): $Li_{1+x}M_{2-x}O_{4-\delta}$ (wherein M in the formula represents transition metals including Mn, Al and Mg) is preferred.

Among others, a lithium transition metal oxide represented by general formula (2): $Li(Li_xMg_yAl_zMn_{2-x-y-z})O_{4-\delta}$ is more preferred.

In general formulas (1) and (2), "x" is preferably 0.01 to 0.09. It is because if the oxide contains a large amount of Li, even if the oxide is washed, it is difficult for Li to come out, and resistance to solvent such as water is increased. Therefore, from such a viewpoint, among others, "x" is preferably 0.02 or more, or 0.08 or less; among others, 0.07 or less; and still among others, more preferably 0.05 or less.

In general formula (2), "y" is preferably 0 to 0.07; among others, 0.05 or less; particularly 0.003 or more or 0.04 or less; still among others, 0.038 or less; still among others, 0.02 or less; and still among others, more preferably 0.011 or less. In other words, it is preferable that the lithium transition metal oxide contain Mg at a proportion of less than 0.5 wt %; among others, more than 0 wt % or 0.05 wt % or less; still among others, 0.05 wt % or more or 0.4 wt % or less; still among others, 0.3 wt % or less; and still among others, 0.15 wt % or less.

Furthermore, in general formula (2), "z" is preferably 0.01 to 0.13; among others, more preferably 0.02 or more or 0.12 or less; still among others, particularly 0.04 or more or 0.10 or less; still among others, 0.045 or more or 0.085 or less; among others, 0.055 or more; and among others, 0.07 or more. In other words, it is preferable that the lithium transition metal oxide contain Al at a proportion of 0.5 wt % to 2.0 wt %; among others, 0.6 wt % or more or 1.8 wt % or less; still among others, 0.6 wt % or more or 1.4 wt % or less; among others, 0.7 wt % or more or 1.3 wt % or less; among others, 0.9 wt % or more; and still among others, 1.1 wt % or more.

Furthermore, the present lithium transition metal oxide powder also includes powder of a 5-V class spinel (that is, a spinel type lithium-manganese-nickel-containing composite oxide having an operating potential of 4.5 V or higher with respect to the Li metal reference potential).

Examples of the general formula of 5-V class spinel include $LiNi_{0.5}Mn_{1.5}O_4$, and a powder containing, as a main component, a spinel type lithium manganese transition metal oxide containing a crystal phase of $LiMn_2O_{4-\delta}$, in which some of the Mn sites are substituted by a metal element M1 including Li and Ni, and another metal element M2.

At this time, the metal element M1 is a substituent element which contributes mainly to the manifestation of an operating potential of 4.5 V or higher with respect to the Li metal reference potential, and examples thereof include Ni, Co and Fe. The metal element M1 includes Ni as an essential component, and may optionally include at least one of Co and Fe. The lithium transition metal oxide may also contain other metal elements as M1.

The metal element M2 is a substituent element which contributes mainly to the stabilization of the crystal structure and an enhancement of characteristics, and is, for example, a substituent element which contributes to an enhancement of the capacity retention ratio. Examples thereof include Mg, Ti, Al, Ba, Cr, and Nb. The lithium transition metal oxide may contain at least one of these Mg, Ti, Al, Ba, Cr, and Nb, and may also contain other metal elements as M2.

For example, an example of the 5-V class spinel may be a spinel type lithium manganese transition metal oxide represented by general formula (3): $Li[Li_aMn_{2-a-b-c}M1_bM2_c]O_{4-\delta}$ (wherein "a" in the formula is 0.00 to 1.0; "b" is 0.30 to 0.70; and "c" is $0.00 \le c$).

Meanwhile, in general formula (3), "c" that represents the content of M2 is particularly preferably 0.001 or more or 0.400 or less.

Also, the 5-V class spinel may also include a composite oxide phase containing Ni, Mn, and B, in addition to the parent phase represented by general formula (3). It is speculated that such a composite oxide containing Ni, Mn, and B exists at the surface of spinel particles or at the grain boundaries.

Examples of the "composite oxide phase containing Ni, Mn, and B" include a crystal phase of $Ni_5MnO_4(BO_3)_2$.

Whether the 5-V class spinel contains the crystal phase of $Ni_5MnO_4(BO_3)_2$ can be checked by comparing the diffraction pattern obtained by X-ray diffraction (XRD), with PDF (Powder Diffraction File) No. "01-079-1029".

Meanwhile, since a compound having a spinel structure generally contains oxygen deficiency, the atomic ratio of oxygen in the above-described general formulas (1), (2), and (3) may be some non-stoichiometry ($4-\delta(0\leq\delta)$), or a portion of oxygen may be substituted by fluorine.

<Angle of Repose>

The present lithium transition metal oxide preferably has an angle of repose of 50° to 75°. When the angle of repose is in such a range, in a case in which the present lithium transition metal oxide is used as a positive electrode active material of a lithium battery, the lithium battery has high packing characteristics, and since the capacity retention ratio can be increased, the power output retention ratio during cycling can be increased. Such a finding may be considered to be contradictory to the conventional knowledge from the viewpoint that a lower angle of repose is preferred. Furthermore, when the angle of repose is adjusted to such a range while the amount of moisture is controlled to the following range, in a case in which the present lithium transition metal oxide is used as a positive electrode active material of a lithium secondary battery, the power output retention ratio during cycling could be increased while maintaining a high capacity retention ratio during cycling.

From such a viewpoint, even in the range described above, the angle of repose of the present lithium transition metal oxide is more preferably 54° or more or 70° or less; and among others, preferably 57° or more; and still among others, 60° or more.

Meanwhile, in the case of a 5-V class spinel, the angle of repose is more preferably 50° to 70°, and among others, preferably 51° or more.

In order to adjust the angle of repose of the present lithium transition metal oxide to the range described above, the present lithium transition metal oxide may be crushed under predetermined conditions, washed under predetermined conditions, dried under predetermined conditions, and then treated to remove any magnetically attracted materials at the surface by magnetic separation. However, it is not intended to be limited to such a method.

In regard to the measurement of the angle of repose, since the angle of repose is affected by adsorbed moisture, in order to suppress fluctuation, it is preferable to control the measurement environment to be, for example, at 25° C. and a humidity of 60% or less, and at the same time, to measure the angle of repose after placing the measurement sample in a desiccator containing a desiccant and drying the measurement sample for one whole day and night at 25° C. so that the adsorbed moisture does not increase before measurement.

Regarding the measurement of the angle of repose, for example, a POWDER TESTER (registered trademark) manufactured by Hosokawa Micron Group is used, a measurement sample (specimen) is introduced through a funnel attached to the POWDER TESTER (registered trademark), the measurement sample (specimen) is supplied until a sufficient heap is formed on a reception tray, and the angle of the heap thus formed may be measured.

<Amount of Moisture>

The present lithium transition metal oxide is preferably such that the amount of moisture (25° C. to 300° C.) measured by the Karl Fischer method is more than 0 ppm and less than 400 ppm.

The amount of moisture (25° C. to 300° C.) measured by the Karl Fischer method includes both the moisture that is physically adsorbed to the present lithium transition metal oxide, and the moisture that is chemically adsorbed to the surface. When the angle of repose is adjusted to the range described above while such an amount of moisture is controlled to be more than 0 ppm and less than 400 ppm, in a case in which the present lithium transition metal oxide is used as a positive electrode active material for a lithium secondary battery, the power output retention ratio during cycling can be increased while having the capacity retention ratio during cycling increased.

From such a viewpoint, in regard to the present lithium transition metal oxide, the amount of moisture (25° C. to 300° C.) measured by the Karl Fischer method is, even in the range described above, more preferably 300 ppm or less, and among others, particularly preferably 240 ppm or less.

Furthermore, it is even more preferable to control the amount of moisture (200° C. to 300° C.) measured by the Karl Fischer method to be 0 ppm or more (preferably, more than 0 ppm) and less than 150 ppm.

The amount of moisture (200° C. to 300° C.) measured by the Karl Fischer method is the moisture that is chemically adsorbed to the surface of the present lithium transition metal oxide, and when such an amount of moisture is defined to be 0 ppm or more (preferably, more than 0 ppm) and less than 150 ppm, the characteristics described above in the case of using the present lithium transition metal oxide as a positive electrode active material for a battery can be further enhanced.

From such a viewpoint, in regard to the present lithium transition metal oxide, the amount of moisture (200° C. to 300° C.) measured by the Karl Fischer method is, even in the range described above, more preferably 60 ppm or less, and among others, particularly preferably 40 ppm or less.

Meanwhile, in order to control the moisture amount of the present lithium transition metal oxide to the range described above, a method of washing the present lithium transition metal oxide under predetermined conditions, and then drying the oxide under predetermined conditions, may be listed as an example of preferred method.

The measurement of the amount of moisture described above may be carried out by measuring the amount of moisture released when a measurement sample (specimen) is heated for 30 minutes in an apparatus set at 200° C. in a nitrogen atmosphere, using a Karl Fischer moisture meter; subsequently increasing the temperature to 300° C., and measuring the amount of moisture released when the measurement sample is heated for 30 minutes at 300° C. At this time, the amount of moisture released when the a measurement sample (specimen) is heated for 30 minutes in an apparatus set at 200° C. in a nitrogen atmosphere is designated as the "amount of moisture (25° C. to 200° C.) measured by the Karl Fischer method", and the amount of moisture released when the measurement sample is heated for 30 minutes at 300° C. is designated as the "amount of moisture (200° C. to 300° C.) measured by the Karl Fischer method". The total amount of the "amount of moisture (ppm) at 25° C. to 200° C." and the "amount of moisture (ppm) at 200° C. to 300° C." may be calculated as the "amount of moisture (ppm) at 25° C. to 300° C.".

<Sulfur Content>

The present lithium transition metal oxide is preferably such that the sulfur content measured by inductively coupled plasma (ICP) emission spectroscopy is more than 0 wt % and less than 0.3 wt %.

The sulfur content measured by inductively coupled plasma (ICP) emission spectroscopy can be considered as a substitute indicator of the amount of impurities such as $Li_2SO_4$ that are attached to the particle surface. When this sulfur content is set to less than 0.3 wt %, the amount of impurities that are attached to the particle surface can be decreased more than the desired reference, and as a result, battery characteristics, specifically characteristics such as the power output retention ratio during cycling, can be further enhanced.

From such a viewpoint, the sulfur content of the present lithium transition metal oxide is more preferably 0.1 wt % or less; among others, 0.03 wt % or less; and still among others, more preferably 0.01 wt % or less.

<Specific Surface Area>

The BET specific surface area of the present lithium transition metal oxide is preferably 0.60 $m^2/g$ or less; among others, 0.05 $m^2/g$ or more or 0.55 $m^2/g$ or less; still among others, 0.08 $m^2/g$ or more or 0.50 $m^2/g$ or less; among others, particularly preferably 0.10 $m^2/g$ or more or 0.40 $m^2/g$ or less; among others, particularly preferably 0.20 $m^2/g$ or more; and still among others, particularly preferably 0.23 $m^2/g$ or more or 0.37 $m^2/g$ or less.

Meanwhile, in the case of a 5-V class spinel, the BET specific surface area is, among others, 0.05 $m^2/g$ or more or 0.55 $m^2/g$ or less, and particularly preferably 0.10 $m^2/g$ or more or 0.50 $m^2/g$ or less.

In order to adjust the BET specific surface area of the present lithium transition metal oxide to the above-described range, the calcination temperature, the raw material particle size, and the like may be appropriately adjusted.

<Average Particle Size of Primary Particles>

The average particle size of primary particles of the present lithium transition metal oxide is preferably 0.5 μm to 5 μm; particularly 0.7 μm or more or 4.0 μm or less; and among others, particularly more preferably 1.0 μm or more or 3.0 μm or less.

Meanwhile, the average particle size of primary particles can be determined by observing the primary particles at an accelerating voltage of 20 kV and a magnification of 3000 times using a scanning electron microscope (HITACHI S-3500N), and analyzing a primary particle image of an electron microscopic photograph using an image analysis software (ANALYSIS FIVE manufactured by Olympus Corp.).

In order to adjust the average particle size of primary particles of the present lithium transition metal oxide to the range described above, the calcination temperature, the raw material particle size, and the like may be appropriately adjusted. Among them, the influence of the calcination temperature is the greatest.

<Amount of Magnetic Substances>

A magnetic substance means a material that attaches to a magnet by magnetic force, such as iron or stainless steel. Specific examples of the magnetic substance include iron, nickel, chromium, zinc, and compounds containing those elements.

In regard to the present lithium transition metal oxide, for example, from the viewpoint that a decrease in voltage at the time of storage at the time of high temperature charging does not easily occur, it is preferable that the amount of magnetic substances measured by a predetermined method be more than 0 ppb and less than 450 ppb. The lower limit of the amount of magnetic substances is preferably zero, but since it is practically extremely difficult to adjust the lower limit to 0 ppb, when feasibility is considered, it is preferable to adjust the amount of magnetic substances to be such that 0 ppb<amount of magnetic substances<450 ppm, and more practically, the amount of magnetic substances is 2 ppb to 450 ppb. However, when the cost for removal is considered, it is more preferable to adjust the amount of magnetic substances to the range of 5 ppb to 250 ppb, or 10 ppb or more or 100 ppb.

Meanwhile, measuring the amount of magnetic substances may allow determination of the presence or absence of the occurrence of any abnormality of facilities.

The amount of magnetic substances described above is a value measured by the following method.

That is, to determine the amount of magnetic substances, a 500-cc resinous container with a lid is used, and 500 cc of ion-exchanged water and a cylindrical stirring bar type magnet coated with tetrafluoroethylene (a magnet whose magnetic force falls in the range of 100 mT to 150 mT when the magnetic force is measured using a TESLA METER Model TM-601 manufactured by Kanetec Co., Ltd.) are added to 100 g of the raw material of a positive electrode active material (powder). The mixture is mounted on a rotary rack of a ball mill and is rotated to be slurrified. Next, the magnet is taken out and immersed in ion-exchanged water, and any excess powder attached to the magnet is removed in an ultrasonic cleaner. Subsequently, the magnet is taken out and immersed in aqua regia, and the magnet is heated at 80° C. for 30 minutes in the aqua regia to dissolve any magnetic substances. The aqua regia in which magnetic substances are dissolved is analyzed for the amounts of iron, nickel, chromium and zinc using an ICP emission analyzer, and by designating the total amounts thereof as the amount of magnetic substances, the amount of magnetic substances per weight of the raw material of the positive electrode active material is calculated. Thereby, the amount of magnetic substances can be determined.

However, in the case of a 5-V class spinel, since the compound contains Ni as a main component, the amounts of iron, chromium and zinc, and the total amounts thereof may be designated as the amount of magnetic substances.

The measurement method described above is a method of dissolving the amount of magnetic substances attached to a magnet in an acid, and thus quantitatively determining the amount of magnetic substances, according to JIS G 1258: 1999.

Since the magnetic substances attached to a magnet are present in a trace amount, it is necessary to immerse every magnet in an acidic solution, and to dissolve the magnetic substances in acid. Thus, it is preferable to use magnets coated with tetrafluoroethylene and to measure the strength of each magnet before measurement.

Meanwhile, regarding the magnetic force of a magnet, it is understood that, for example, even for magnets of the same kind that are commercially available as magnets having a magnetic force of 130 mT, when the magnetic force is measured using a TESLA METER Model TM-601 manufactured by Kanetec Co., Ltd., the measurement values fluctuate in the range of about 100 mT to 150 mT. On the other hand, it has been confirmed that as long as a magnet having a magnetic force measured as such in the range of about 100 mT to 150 mT is used, the amount of magnetic substances defined by the present invention remains the same. Therefore, according to the present invention, the magnetic force of the magnet in relation to the method for measuring the amount of magnetic substances is defined to be in the range of 100 mT to 150 mT.

<Production Method>

Next, the method for producing the present lithium transition metal oxide will be described.

The present lithium transition metal oxide can be produced through a step of mixing raw materials such as a manganese compound and a lithium salt (raw material mixing step); a step of calcining the raw materials thus mixed (calcination step); a step of bringing a powder of a spinel type (Fd-3 m) lithium transition metal oxide thus obtained, into contact with a polar solvent such as water to wash the powder (washing step); a step of heating the washed product to 120° C. to 700° C. to dry (drying step); and optionally, a magnetic separation step. However, the present invention is not intended to be limited to such a production method.

(Raw Material Mixing Step)

Regarding the starting raw materials, at least a lithium raw material and a manganese raw material may be appropriately selected.

The lithium raw material is not particularly limited, and examples include lithium salts, for example, lithium hydroxide (LiOH), lithium carbonate ($Li_2CO_3$), lithium nitrate ($LiNO_3$), $LiOH.H_2O$, lithium oxide ($Li_2O$), other fatty acid lithium compounds, and lithium halides. Among them, hydroxide, carbonate, and nitrate of lithium are preferred.

Regarding the manganese raw material, any one of manganese compounds such as manganese dioxide, trimanganese tetroxide, dimanganese trioxide, and manganese carbonate, or a mixture formed from a combination of two or more kinds selected from these, can be used.

Regarding manganese dioxide, chemically synthesized manganese dioxide (CMD), electrolytic manganese dioxide (EMD) obtainable by electrolysis, manganese carbonate, or natural manganese dioxide can be used. Among them, electrolytic manganese dioxide is preferred from the viewpoint that since electrolytic manganese dioxide is produced in a manganese sulfate electrolytic bath as described above, a relatively large amount of sulfides such as $SO_4$ come to be present inside the particles, and therefore, the effect of the present invention can be provided more effectively.

In addition to those, a magnesium raw material or an aluminum raw material can also be incorporated.

At this time, there are no particular limitations on the magnesium raw material, and for example, magnesium oxide (MgO), magnesium hydroxide ($Mg(OH)_2$), magnesium fluoride ($MgF_2$), and magnesium nitrate ($Mg(NO_3)_2$) can be used. Among them, magnesium oxide is preferred.

There are no particular limitations on the aluminum raw material. For example, aluminum hydroxide ($Al(OH)_3$) and aluminum fluoride ($AlF_3$) can be used, and among them, aluminum hydroxide is preferred.

Meanwhile, in the case of a 5-V class spinel type lithium-manganese-nickel-containing composite oxide, as the M1 metal salt compound or the M2 metal salt compound, for example, carbonate, nitrate, chloride, oxyhydroxide, or hydroxide of M1 or M2 can be used.

Furthermore, a boron compound may also be incorporated.

When a boron compound is added, and the mixture is calcined, since sintering of fine particles in which crystal grains of a spinel type lithium transition metal oxide have gathered can be accelerated, and densely aggregated fine particles (secondary particles) can be formed thereby, the packing density (tap density) can be increased. At the same time, since the production and growth of crystals of the spinel type lithium transition metal oxide can be accelerated, the size of crystallites of the spinel type lithium transition metal oxide can be increased, so that the number of interfaces within the primary particles can be decreased, and thereby, the discharge capacity upon high-load discharge (3 C) can be increased.

At this time, the boron compound may be any compound containing boron (B element). It is speculated that a boron compound added before calcination undergoes a change in the form as a result of calcination, but it is not easy to accurately specify the form. However, it has been confirmed that since the relevant boron (B element) exists in a state of being eluted in water, the B element is not a spinel-constituting element, and exists outside the spinel as a boron compound of a certain form. Therefore, boron (B element) does not exist within the spinel, and a clear concentration gradient of boron (B element) does not exist at the surface and in the interior of crystal grains.

However, in the case of a 5-V class spinel, it is speculated that the added boron (B element) reacts with Ni or Mn and forms a composite oxide phase including Ni, Mn and B, and the composite oxide phase exists at the surface, grain boundaries, and the like of spinel particles.

Regarding the boron compound, at the time of calcining a spinel type lithium transition metal oxide as described above, when a boron compound is added thereto and calcined together, the boron compound accomplishes the role of accelerating sintering of the spinel type lithium transition metal oxide. Therefore, it is contemplated that other compounds having the same effect, that is, substances having melting points that are lower than or equal to the calcination temperature, for example, compounds such as a vanadium compound ($V_2O_5$), an antimony compound ($Sb_2O_3$), and a phosphorus compound ($P_2O_5$), can also give the same effect.

In addition, a substance that is known as a starting raw material of the lithium transition metal oxide can be incorporated.

Regarding the mixing of the raw materials, the method is not particularly limited as long as the raw materials can be uniformly mixed. For example, the respective raw materials may be added simultaneously or in an appropriate order, and may be stirred and mixed in a wet mode or a dry mode, using a known mixing machine such as a mixer. When an element that is not easily substitutable, for example, aluminum, is added, it is preferable to employ wet mixing.

Regarding dry mixing, for example, a mixing method using a precision mixing machine which rotates a mixed powder at a high speed may be used.

On the other hand, regarding wet mixing, a mixing method of adding a liquid medium such as water or a dispersant, performing wet mixing to slurrify the raw materials, and pulverizing the slurry thus obtained using a wet type pulverizing machine, may be used. It is particularly preferable to pulverize the slurry to a size in the order of submicrons. When the slurry is pulverized to a size in the order of submicrons, and then is subjected to granulation and calcination, uniformity of the various particles before the calcination reaction can be increased, and reactivity can be increased.

(Granulation)

The raw materials mixed as described above may be calcined after being granulated to a predetermined size, if necessary. However, granulation is not an essential process.

The granulation method may be a wet method or may be a dry method, as long as the various raw materials pulverized in the previous step are dispersed in the granulated particles without being separated, and examples of the granulation method include an extrusion granulation method, a rotating granulation method, a fluidized granulation method, a mixing granulation method, a spray drying granulation method, a pressure molding granulation method, and a flake granulation method using a roll or the like. However, when wet granulation is carried out, it is necessary to dry the granules sufficiently before calcination.

Regarding the drying method that is useful at this time, the granules may be dried according to a known drying method such as a thermal spray drying method, a hot air drying method, a vacuum drying method, or a freeze-drying method, and among them, a thermal spray drying method is preferred. The thermal spray drying method is preferably carried out using a thermal spray drying machine (spray dryer). When granulation is carried out using a thermal spray drying machine (spray dryer), a sharper particle size distribution can be obtained, and secondary particles can be produced in a form including aggregate particles (secondary particles) that are formed by particles aggregating in a round shape.

(Calcination Step)

Regarding calcination, for example, it is preferable to perform calcination in an air atmosphere, at 700° C. to 1050° C.; among others, at a temperature of 710° C. or higher or 980° C. or lower; still among others, at a temperature of 720° C. or higher or 970° C. or lower; still among others, particularly at a temperature of 740° C. or higher or 960° C. or lower; among others, at a temperature of 750° C. or higher or 950° C. or lower; and still among others, at a temperature of 940° C. or lower.

Meanwhile, this calcination temperature means the product temperature of a calcination product that is measured by bringing a thermocouple into contact with the calcination product inside a calcining furnace.

The calcination time, that is, the time for maintaining the calcination temperature, may vary with the calcination temperature, but it is preferable to set the calcination time to 0.5 hours to 90 hours; among others, 1 hour or more or 80 hours or less; and still among others, 4 hours or more or 30 hours or less.

Regarding the rate of temperature decrease after calcination, it is preferable to cool slowly at a cooling rate of 10° C./min or less at least to 500° C., and it is more preferable to control the rate to, among others, 0.1° C./min or more or 8° C./min or less, and still among others, particularly to 0.5° C./min or more or 5° C./min or less.

There are no particular limitations on the kind of the calcining furnace, and calcination can be carried out using, for example, a rotary kiln, a static furnace, or another calcining furnace.

(Crushing or Pulverization)

After calcination, it is preferable to crush or pulverize the spinel type (Fd-3 m) lithium transition metal oxide thus obtained, if necessary.

At this time, the degree of crushing or pulverization is preferably such that the primary particles should not be disintegrated.

(Washing Step)

In the present production method, it is preferable to bring a powder of the spinel type (Fd-3 m) lithium transition metal oxide ("also referred to as "present lithium transition metal oxide powder") obtained as described above, into contact with a polar solvent, and to wash the powder so as to detach the impurities included in the powder.

Meanwhile, the present lithium transition metal oxide powder also includes a powder of a 5-V class spinel as described above.

For example, the present lithium transition metal oxide powder and a polar solvent are mixed and stirred to obtain a slurry, and the slurry thus obtained may be subjected to solid-liquid separation by filtration or the like, so as to eliminate impurities. At this time, solid-liquid separation may be carried out as a subsequent process.

Meanwhile, the term slurry means a state in which the present lithium transition metal oxide powder is dispersed in a polar solvent.

For the polar solvent that is used for washing, it is preferable to use water.

Water may be tap water, but it is preferable to use ion-exchanged water or pure water that has been passed through a filter or a wet type magnetic separator.

The pH of water is preferably 4 to 10, and among others, the pH is more preferably 5 or higher or 9 or lower.

In regard to the liquid temperature at the time of washing, it has been confirmed that if the liquid temperature at the time of washing is low, the battery characteristics become more satisfactory. Therefore, from such a viewpoint, the liquid temperature is preferably 5° C. to 70° C.; among others, more preferably 60° C. or lower; and still among others, particularly preferably 45° C. or lower. Also, the liquid temperature is more particularly preferably 30° C. or lower.

The reason why the battery characteristics become more satisfactory when the liquid temperature at the time of washing is low, is speculated to be that if the liquid temperature is too high, lithium in the lithium transition metal oxide is ion-exchanged with protons of the ion-exchanged water, and thus lithium fall out and affect the high temperature characteristics.

In regard to the amount of the polar solvent that is brought into contact with the present lithium transition metal oxide powder, it is preferable to adjust the mass ratio of the present lithium transition metal oxide powder with respect to the polar solvent (also referred to as "slurry concentration") to 10 wt % to 70 wt %; among others, to 20 wt % or more or 60 wt % or less; still among others, to 30 wt % or more or 50 wt % or less. When the amount of the polar solvent is 10 wt % or more, impurities such as $SO_4$ are easily eluted, and on the contrary, when the amount is 60 wt % or less, a washing effect adequate for the amount of the polar solvent can be obtained.

(Magnetic Separation Step)

In the present production method, if necessary, it is preferable to conduct magnetic separation, that is, a treatment for removing impurities that magnetically attach to a magnet from the present lithium transition metal oxide powder. By performing magnetic separation, impurities that cause short circuits can be eliminated.

Such magnetic separation may be carried out at any time point of the present production method. For example, it is preferable to perform magnetic separation after the washing step, or after the crushing or pulverization that is carried out at the end. As the magnetic separation is carried out after the final crushing or pulverization, iron and the like that are contaminated as a result of breakage of a crushing machine or a pulverizing machine can also be finally eliminated.

Regarding the method for magnetic separation, any one of a dry type magnetic separation method of bringing the present lithium transition metal oxide powder in a dry state into contact with a magnet, or a wet type magnetic separation method of bringing a slurry of the present lithium transition metal oxide powder into contact with a magnet, may be used.

From the viewpoint of the magnetic separation efficiency, a wet type magnetic separation method is preferred since the present lithium transition metal oxide powder in a more dispersed state, in other words, in a state that the powder is not aggregated, can be brought into contact with a magnet.

Meanwhile, in the case of performing magnetic separation after washing, it is preferable to select a wet type magnetic separation method since the process of magnetic separation can be combined with the washing step. On the contrary, in the case of performing magnetic separation after the crushing or pulverization that is carried out at the end, it is preferable to employ a dry type magnetic separation method since it is not necessary to dry the present lithium transition metal oxide powder thereafter.

When a wet type magnetic separation method is carried out in combination with the washing step, the present lithium transition metal oxide powder and a polar solvent are mixed and stirred in the washing step to obtain a slurry, the slurry obtained by the magnetic separation step is fed to a wet type magnetic separator to be magnetically separated, and then the slurry is filtered. Thereby, impurities separated in the washing step and the magnetic separation step can be collected and removed by separation from the present lithium transition metal oxide powder.

The structure of the wet type magnetic separator may be arbitrary. For example, a magnetic separator having a configuration in which a filter or fin-like magnets are installed inside a pipe may be mentioned as an example.

The magnetic force of the magnet used for the magnetic separation (: magnetic force of the place that is brought into contact with the present lithium transition metal oxide powder) is preferably 5,000 G to 20,000 G (Gauss); particularly preferably 10,000 G or more or 20,000 G or less; and among others, particularly more preferably 12,000 G or more or 20,000 G or less.

When the magnetic force of the magnet is 5,000 G or more, a desired magnetic separation effect can be obtained, and when the magnetic force of the magnet is 20,000 G or less, excessive removal of even necessary materials can be prevented.

When the present lithium transition metal oxide powder and a polar solvent are mixed and stirred to obtain a slurry in the washing step, and the slurry thus obtained is fed into a wet type magnetic separator to be magnetically separated in the magnetic separation step, the supply rate of the slurry that is supplied to magnetic separation is set to preferably 0.2 m/sec to 3.0 m/sec; among others, 0.3 m/sec or more or 2.0 m/sec or less; and still among others, preferably 0.5 m/sec or more or 1.5 m/sec or less, from the viewpoint of increasing the magnetic separation efficiency.

(Drying Step)

In the drying step, it is preferable to dry the present lithium transition metal oxide powder by heating to 120° C. to 700° C. This temperature is the product temperature of the present lithium transition metal oxide powder.

The drying temperature is preferably 120° C. to 700° C. as described above; among others, 300° C. or higher; still among others, 340° C. or higher; or preferably in a region of lower temperatures than the first oxygen release temperature.

The "first oxygen release temperature" means a temperature at which oxygen is released for the first time when a spinel type lithium transition metal oxide is heated, and for example, the "first oxygen release temperature" can be determined as the temperature (° C.) at which weight loss is initiated in the range of 600° C. to 900° C. when a spinel type lithium transition metal oxide is heated.

It is preferable to heat the compound in a temperature region lower than the first oxygen release temperature, because if the compound is heated to a temperature higher than or equal to the first oxygen release temperature, oxygen deficiency may occur.

Regarding the atmosphere for drying, it is preferable to carry out drying in an atmosphere containing oxygen, for example, in air.

Furthermore, since it is preferable to carry out drying in an atmosphere with a humidity as low as possible, for example, it is preferable to carry out the treatment using a heating apparatus or a drying apparatus, each equipped with a forced exhaust device, at an average water vapor emission rate of 0.008 g/sec to 300 g/sec; among others, at 0.5 g/sec or more or 200 g/sec or less; and still among others, at 1.0 g/sec or more or 150 g/sec or less.

Meanwhile, the water vapor emission rate is an amount of evaporable moisture contained in a powder of a spinel type lithium transition metal oxide per unit time, and in the Examples that will be described below, the time period in which 15% of the amount of moisture contained in a powder of a spinel type lithium transition metal oxide can be evaporated, is measured to calculate the water vapor emission rate.

(Classification)

After drying, it is preferable to perform classification after any one or both of crushing and pulverization are carried out as necessary.

Furthermore, as described above, it is preferable to carry out magnetic separation, particularly a dry type magnetic separation method, thereafter.

<Characteristics and Applications>

A lithium transition metal oxide obtained by the present production method can be effectively utilized as a positive electrode active material for lithium batteries (therefore, referred to as "present positive electrode active material").

For example, a positive electrode mixture can be produced by mixing the present positive electrode active material, a conductive material formed of carbon black or the like, and a binding agent formed of a TEFLON (registered trademark) binder or the like. Then, a lithium secondary battery can be constructed using such a positive electrode mixture for a positive electrode; using, for example, lithium or a material capable of storing and releasing lithium, such as carbon, for a negative electrode; and using a solution obtained by dissolving a lithium salt such as lithium hexafluorophosphate ($LiPF_6$) in a mixed solvent such as ethylene carbonate-dimethyl carbonate, for a non-aqueous electrolyte. However, the present invention is not meant to be limited to a battery having such a configuration.

Description of Terms

The term "lithium battery" means to include all of the batteries containing lithium or lithium ions therein, such as a lithium primary battery, a lithium secondary battery, a lithium ion secondary battery, and a lithium polymer battery.

When the expression "X~Y" (X and Y being arbitrary numbers) is used in the present specification, unless particularly stated otherwise, the expression has a meaning of "from X to Y", as well as a meaning of "preferably more than X" or "preferably less than Y".

Furthermore, the expression "X or more" (X being an arbitrary number) or "Y or less" (Y being an arbitrary number) is used, the expression also includes the intention that "preferably larger than X" or "preferably less than Y".

EXAMPLES

Hereinafter, the present invention will be described in more detail by way of Examples and Comparative Examples described below. However, the present invention is not intended to be limited to the Examples described below.

Example 1

Lithium carbonate, electrolytic manganese dioxide that had been treated by magnetic separation (referred to as "magnetically separated electrolyte manganese dioxide"), magnesium oxide, aluminum hydroxide, and lithium tetraborate were mixed with a precision mixing machine, and then a mixed raw material was obtained.

The mixed raw material thus obtained was filled in a calcination vessel (crucible made of alumina, size=length*width*height=10*10*5 (cm)) such that the ratio of the open area and the filling height (open area $cm^2$/filling height cm) would be 100. The apparent density of the raw material at this time was 1.1 $g/cm^3$. The raw material was calcined at 850° C. for 15 hours in an electric furnace, the temperature was lowered to 500° C. at a rate of 0.5° C./min, and then the calcined product was cooled naturally to room temperature. Subsequently, the calcined product was crushed with a shear type crusher, and then was subjected to secondary crushing with a high speed jet stream rotary pulverizer. Thus, a spinel type lithium transition metal oxide (powder) was produced.

Meanwhile, the lithium tetraborate mentioned above was weighed and added such that the content of boron in the spinel type lithium transition metal oxide after crushing would be 0.08% by mass.

7000 g of the spinel type lithium transition metal oxide (powder) thus obtained and 13.5 L of ion-exchanged water (pH 5.8) were mixed and stirred for 10 minutes to be washed, and this was used as a slurry of lithium manganate (slurry concentration 34% by mass). The liquid temperature at this time was 25° C.

This slurry was passed through a wet magnetic separator at a rate of 1.0 m/sec, and then was filtered under reduced pressure.

Next, the spinel type lithium transition metal oxide (powder) thus separated by filtration was heated by retaining the oxide for 5 hours at 350° C. (product temperature) in air, and was dried thereby at a water vapor emission rate of 1.0 g/sec. Subsequently, the spinel type lithium transition metal oxide was subjected to classification using a classifier, and then was subjected to magnetic separation. Thus, a powdered spinel type lithium transition metal oxide (sample) having a particle size of under 325-mesh was obtained.

The results of a chemical analysis of the spinel type lithium transition metal oxide (sample) thus obtained are presented in Table 1 (the same applies to Examples and Comparative Examples that will be described below).

Example 2

A spinel type lithium transition metal oxide (sample) was obtained in the same manner as in Example 1, except that the mixing ratio of lithium carbonate, magnetically separated electrolytic manganese dioxide, magnesium oxide, and aluminum hydroxide was changed, and also, the drying conditions after washing were changed to retain the product at 300° C. (product temperature) for 5 hours.

Example 3

A spinel type lithium transition metal oxide (sample) was obtained in the same manner as in Example 1, except that the mixing ratio of lithium carbonate, magnetically separated electrolytic manganese dioxide, magnesium oxide, and aluminum hydroxide was changed, and also, the drying conditions after washing were changed to retain the product at 300° C. (product temperature) for 10 hours.

Example 4

A spinel type lithium transition metal oxide (sample) was obtained in the same manner as in Example 1, except that the mixing ratio of lithium carbonate, magnetically separated electrolytic manganese dioxide, magnesium oxide, and aluminum hydroxide was changed, and also, the drying conditions after washing were changed to retain the product at 400° C. (product temperature) for 5 hours.

Example 5

A spinel type lithium transition metal oxide (sample) was obtained in the same manner as in Example 1, except that the mixing ratio of lithium carbonate, magnetically separated electrolytic manganese dioxide, magnesium oxide, and aluminum hydroxide was changed, and also, the drying conditions after washing were changed to retain the product at 400° C. (product temperature) for 10 hours.

Example 6

A spinel type lithium transition metal oxide (sample) was obtained in the same manner as in Example 1, except that the mixing ratio of lithium carbonate, magnetically separated electrolytic manganese dioxide, and aluminum hydroxide was changed, and also, the drying conditions after washing were changed to retain the product at 350° C. (product temperature) for 10 hours.

Example 7

A spinel type lithium transition metal oxide (sample) was obtained in the same manner as in Example 1, except that the mixing ratio of lithium carbonate, magnetically separated electrolytic manganese dioxide, and aluminum hydroxide was changed, and also, the drying conditions after washing were changed to retain the product at 350° C. (product temperature) for 10 hours.

Example 8

A spinel type lithium transition metal oxide (sample) was obtained in the same manner as in Example 1, except that the mixing ratio of lithium carbonate, magnetically separated electrolytic manganese dioxide, magnesium oxide, and aluminum hydroxide was changed.

Example 9

Lithium carbonate, magnetically separated electrolytic manganese dioxide, magnesium oxide, aluminum hydroxide, and lithium tetraborate were mixed with a precision mixing machine, and then a mixed raw material was obtained.

The mixed raw material thus obtained was filled in a calcination vessel (crucible made of alumina, size=length*width*height=10*10*5 (cm)) such that the ratio of the open area and the filling height (open area cm$^2$/filling height cm) would be 100. The apparent density of the raw material at this time was 1.1 g/cm$^3$. The raw material was calcined at 900° C. for 15 hours in an electric furnace, the temperature was lowered to 500° C. at a rate of 0.5° C./min, and then the calcined product was cooled naturally to room temperature. Subsequently, the calcined product was crushed with a shear type crusher, and thus a spinel type lithium transition metal oxide (powder) was produced.

Meanwhile, the lithium tetraborate mentioned above was weighed and added such that the content of boron in the spinel type lithium transition metal oxide after crushing would be 0.08% by mass.

7000 g of the spinel type lithium transition metal oxide (powder) thus obtained and 13.5 L of ion-exchanged water (pH 5.8) were mixed and stirred for 10 minutes to be washed, and this was used as a slurry of lithium manganate (slurry concentration 40% by mass). The liquid temperature at this time was 25° C.

Next, the spinel type lithium transition metal oxide (powder) that had been separated by filtration was heated by retaining the oxide for 5 hours at 200° C. (product temperature) in air, and was dried thereby at a water vapor emission rate of 1.0 g/sec. Subsequently, the spinel type lithium transition metal oxide was subjected to classification using a classifier, and then was subjected to magnetic separation. Thus, a powdered spinel type lithium transition metal oxide (sample) having a particle size of under 325-mesh was obtained.

Example 10

A spinel type lithium transition metal oxide (sample) was obtained in the same manner as in Example 9, except that the mixing ratio of lithium carbonate, magnetically separated electrolytic manganese dioxide, magnesium oxide, and aluminum hydroxide was changed, and also, the drying conditions after washing were changed to retain the product at 200° C. (product temperature) for 10 hours.

Example 11

A spinel type lithium transition metal oxide (sample) was obtained in the same manner as in Example 9, except that the mixing ratio of lithium carbonate, magnetically separated electrolytic manganese dioxide, magnesium oxide, and aluminum hydroxide was changed, the slurry concentration at the time of washing was changed to 50% by mass, and the drying conditions after washing were changed to retain the product at 120° C. (product temperature) for 5 hours.

Example 12

A spinel type lithium transition metal oxide (sample) was obtained in the same manner as in Example 9, except that the mixing ratio of lithium carbonate, magnetically separated electrolytic manganese dioxide, magnesium oxide, and aluminum hydroxide was changed, the slurry concentration at the time of washing was changed to 50% by mass, and the drying conditions after washing were changed to retain the product at 120° C. (product temperature) for 10 hours.

Example 13

A spinel type lithium transition metal oxide (sample) was obtained in the same manner as in Example 9, except that the mixing ratio of lithium carbonate, magnetically separated electrolytic manganese dioxide, magnesium oxide, and aluminum hydroxide was changed, the slurry concentration at the time of washing was changed to 60% by mass, and the drying conditions after washing were changed to retain the product at 200° C. (product temperature) in a vacuum for 10 hours.

Example 14

A spinel type lithium transition metal oxide (sample) was obtained in the same manner as in Example 9, except that the mixing ratio of lithium carbonate, magnetically separated electrolytic manganese dioxide, magnesium oxide, and aluminum hydroxide was changed, the slurry concentration at the time of washing was changed to 70% by mass, and the drying conditions after washing were changed to retain the product at 200° C. (product temperature) in a vacuum for 10 hours.

Example 15

Lithium carbonate, magnetically separated electrolytic manganese dioxide, magnesium oxide, aluminum hydroxide, and lithium tetraborate were mixed with a precision mixing machine, and then a mixed raw material was obtained.

The mixed raw material thus obtained was filled in a calcination vessel (crucible made of alumina, size=length*width*height=10*10*5 (cm)) such that the ratio of the open area and the filling height (open area cm$^2$/filling height cm) would be 100. The apparent density of the raw material at this time was 1.1 g/cm$^3$. The raw material was calcined at 800° C. for 20 hours in an electric furnace, the temperature was lowered to 500° C. at a rate of 0.5° C./min, and then the calcined product was cooled naturally to room temperature. Subsequently, the calcined product was crushed with a shear type crusher, and then was subjected to secondary crushing with a high speed jet stream rotary pulverizer. Thus, a spinel type lithium transition metal oxide (powder) was produced.

Meanwhile, the lithium tetraborate mentioned above was weighed and added such that the content of boron in the spinel type lithium transition metal oxide after crushing would be 0.16% by mass.

7000 g of the spinel type lithium transition metal oxide (powder) thus obtained and 13.5 L of ion-exchanged water (pH 5.8) were mixed and stirred for 10 minutes to be washed, and this was used as a slurry of lithium manganate (slurry concentration: 34% by mass). The liquid temperature at this time was 25° C.

This slurry was passed through a wet magnetic separator at a rate of 1.0 m/sec, and then was filtered under reduced pressure.

Next, the spinel type lithium transition metal oxide (powder) thus separated by filtration was heated by retaining the oxide for 5 hours at 350° C. (product temperature) in air, and was dried thereby at a water vapor emission rate of 1.0 g/sec. Subsequently, the spinel type lithium transition metal oxide was subjected to classification using a classifier, and then was subjected to magnetic separation. Thus, a powdered spinel type lithium transition metal oxide (sample) having a particle size of under 325-mesh was obtained.

Example 16

A spinel type lithium transition metal oxide (sample) was obtained in the same manner as in Example 15, except that the mixing ratio of lithium carbonate, magnetically separated electrolytic manganese dioxide, magnesium oxide, aluminum hydroxide, and lithium tetraborate was changed, and also, the calcination conditions were changed to calcine the raw material at 750° C. (product temperature) for 20 hours in an electric furnace.

Meanwhile, the lithium tetraborate mentioned above was weighed and added such that the content of boron in the spinel type lithium transition metal oxide after crushing would be 0.24% by mass.

Example 17

Lithium carbonate, electrolytic manganese dioxide that had been subjected to magnetic separation, nickel hydroxide, and lithium tetraborate were subjected to wet mixing and spray drying, and thus a mixed raw material was obtained.

The mixed raw material thus obtained was filled in a calcination vessel (crucible made of alumina, size=length*width*height=10*10*5 (cm)) such that the ratio of the open area and the filling height (open area $cm^2$/filling height cm) would be 100. The apparent density of the raw material at this time was 1.1 $g/cm^3$.

The raw material was calcined at 950° C. for 70 hours in an electric furnace and was subsequently heat treated at 700° C. for 70 hours, and then the calcined product was cooled naturally to room temperature. The calcined product obtained by heat treating was classified with a sieve having a mesh size of 75 μm and was subjected to magnetic separation, and thus a spinel type lithium manganese transition metal oxide (powder) was obtained.

1 kg of the spinel type lithium manganese transition metal oxide powder thus obtained was fed into a plastic beaker with a handle (capacity: 2000 mL) containing 2000 mL of water at pH 6 to 7 and a temperature of 20° C., and the content was stirred for 10 minutes using a stirrer (propeller area: 24 $cm^2$) at a speed of rotation of 200 rpm to 250 rpm. Stirring was stopped, the stirrer was taken out from water, and the flask content was left to stand for 2 minutes. Then, the supernatant in an amount up to 5/12 of the height (30% to 45%) was removed using a suction filtering machine (membrane filter: 0.1 μm), and a precipitate was collected using a suction filtering machine (filter paper 131). The sediment thus obtained was left to stand for 24 hours in an environment at 120° C. to dry, and then was left to stand for 24 hours in a state of being heated to a product temperature of 500° C. to dry. Subsequently, the product was crushed with a shear type crusher, classified with a sieve having a mesh size of 75 lam, and subjected to magnetic separation. Thus, a 5-V class spinel type lithium manganese transition metal oxide powder (sample) represented by the above general formula (3) was obtained.

Example 18

The powder obtained in Example 17 was further subjected to secondary crushing with a high speed jet stream rotary pulverizer, classified with a sieve having a mesh size of 75 μm, and subjected to magnetic separation. Thus, a 5-V class spinel type lithium manganese transition metal oxide powder (sample) in the form of a powder having a different particle size was obtained.

Comparative Example 1

Lithium carbonate, magnetically separated electrolytic manganese dioxide, and magnesium oxide were mixed with a precision mixing machine, and then a mixed raw material was obtained.

The mixed raw material thus obtained was filled in a calcination vessel (crucible made of alumina, size=length*width*height=10*10*5 (cm)) such that the ratio of the open area and the filling height (open area $cm^2$/filling height cm) would be 100. The apparent density of the raw material at this time was 1.1 $g/cm^3$. The raw material was calcined at 900° C. for 15 hours in an electric furnace, crushed using a shear type crusher, and subjected to classification using a classifier. Thus, a spinel type lithium transition metal oxide (powder) having a size of under 325-mesh was produced.

[Evaluation]

For the spinel type lithium transition metal oxides (powders) obtained in Examples and Comparative Example, various characteristics were evaluated by the methods described below.

<Chemical Analysis Measurement>

The amount of lithium, the amount of manganese, the amount of magnesium, the amount of aluminum, the amount of boron, and the amount of sulfur of the spinel type lithium transition metal oxides (powders) obtained in Examples and Comparative Example were measured by inductively coupled plasma (ICP) emission spectroscopy. The amounts are presented in Table 1 or Table 2.

<Measurement of Angle of Repose>

Since measurement of the angle of repose is affected by adsorbed moisture, from the viewpoint of suppressing fluctuations, the measurement environment was controlled to be at a temperature of 25° C. and a humidity of 60% or lower. Furthermore, a sample was dried for one whole day and night at 25° C. in a desiccator containing a desiccant so that the adsorbed moisture would not increase before measurement, and then the angle of repose was measured using a POWDER TESTER (registered trademark) "PT-R type" manufactured by Hosokawa Micron Group. That is, spinel type lithium transition metal oxide (powder) was introduced through a funnel attached to the POWDER TESTER (registered trademark), the sample was supplied until a sufficient heap was formed on a reception tray, and the angle of the heap thus formed was measured.

<Method for Measuring Amount of Moisture According to Karl Fischer Method>

The amount of moisture released when each of the spinel type lithium transition metal oxides (powders) obtained in Examples and Comparative Example was heated using a Karl Fischer moisture meter (Model CA-100 manufactured by Mitsubishi Chemical Corp.), inside the apparatus set at 200° C. in a nitrogen atmosphere for 30 minutes, was measured. Subsequently, the temperature was increased to 300° C., and then the amount of moisture released when the powder was heated at 300° C. for 30 minutes was measured.

Then, the measurement value of the amount of moisture released when the powder was heated in the apparatus set at 200° C. in a nitrogen atmosphere for 30 minutes was designated as "KF moisture (ppm) at 25° C. to 200° C.", the amount of moisture released when the powder was heated at 300° C. for 30 minutes was designated as "KF moisture (ppm) at 200° C. to 300° C.", and the total amount of the "KF moisture (ppm) at 25° C. to 200° C." and the "KF moisture (ppm) at 200° C. to 300° C." was designated as "KF moisture (ppm) at 25° C. to 300° C.".

<BET Specific Surface Area (SSA)>

Measurement of the BET specific surface area (SSA) was carried out using a MONOSORB (trade name) manufactured by Yuasa Ionics Co., Ltd., according to JIS R1626-1996 (Measuring methods for the specific surface area of fine ceramic powders by gas adsorption using the BET method), "6.2 Flow method, (3.5) One-point method".

In that occasion, a mixed gas of helium as a carrier gas and nitrogen as an adsorbate gas was used.

<Measurement of Average Particle Size of Primary Particles>

Each of the spinel type lithium transition metal oxides (powders) obtained in Examples and Comparative Example was observed using a scanning electron microscope (HITACHI S-3500N) at an accelerating voltage of 20 kV and a magnification of 3000 times, and primary particle images of the electron microscopic photographs were analyzed using an image analysis software (ANALYSIS FIVE manufactured by Olympus Corp.) to calculate the average particle size of the primary particles.

<Measurement of Amount of Magnetic Substances>

Measurement was carried out by employing a method of slurrifying each of the spinel type lithium transition metal oxides (powders) obtained in Examples and Comparative Example, introducing a magnet coated with tetrafluoroethylene into the slurry to attach magnetic substances to the magnet, subsequently acid-dissolving the magnetic substances attached to the magnet, and quantitatively measuring the amount of magnetic substances according to JIS G 1258:1999. The method will be described in detail below.

Meanwhile, since the magnetic substances attached in the magnet are present in a trace amount, it is necessary to immerse every magnet in an acidic solution, and to dissolve the magnetic substances in acid. Thus, magnets coated with tetrafluoroethylene were used, and the strength of each magnet was measured before the measurement. The strength of the magnet was measured using a TESLA METER Model TM-601 manufactured by Kanetec Co., Ltd.

100 g of a spinel type lithium transition metal oxide (powder) was introduced into a 500-cc resinous container with a lid, and 500 cc of ion-exchanged water and a cylindrical stirring bar type magnet coated with tetrafluoroethylene (magnetic force measured using a TESLA METER Model TM-601 manufactured by Kanetec Co., Ltd.: 132 mT) were added thereto. The mixture was mounted on a rotary rack of a ball mill and was rotated at a speed of rotation of 60 rpm as adjusted in advance for 30 minutes to be slurrified. Subsequently, the magnet was taken out, placed in a 100-mL beaker, and immersed in ion-exchanged water, and the magnet was washed for 3 minutes using an ultrasonic cleaner (Model US-205 manufactured by SND Corp.) under the setting of double frequency output switching, thereby removing any excess powder that had attached to the magnet. The process of replacing the ion-exchanged water having the magnet immersed therein and washing by ultrasonication was repeated eight times. Thereafter, the magnet was taken out, placed in a 50-mL graduated cylinder, and immersed in aqua regia (a liquid prepared by mixing concentrated hydrochloric acid and concentrated nitric acid at a volume ratio of 3:1) in an amount in which the magnet would be completely submerged. The magnet was heated at 80° C. for 30 minutes in aqua regia to dissolve magnetic substances. The magnet was taken out from aqua regia, and the aqua regia in which the magnetic substances were dissolved was diluted with ion-exchanged water. The diluted aqua regia was analyzed for the amounts of iron, nickel, chromium, and zinc using an ICP emission analyzer, and with the total amount thereof designated as the amount of magnetic substances, the amount of magnetic substances per weight of the raw material of the positive electrode active material was calculated. This amount is indicated as the amount of magnetic substances (ppb) in the tables.

However, since the 5-V class spinels of Examples 17 and 18 contained Ni as a main component, the amounts of iron, chromium and zinc were analyzed, except for Ni, using an ICP emission analyzer, and the total amount thereof was designated as the amount of magnetic substances.

<Battery Evaluation>

(Production of Battery)

8.80 g of a spinel type lithium transition metal oxide (powder), 0.60 g of acetylene black (manufactured by Denki Kagaku Kogyo K.K.), and 5.0 g of a liquid obtained by dissolving PVDF (manufactured by Kishida Chemical Co., Ltd.) in NMP (N-methylpyrrolidone) at a concentration of 12 wt % were accurately measured, 5 ml of NMP was added thereto, and the mixture was sufficiently mixed to produce a paste. This paste was applied on an aluminum foil as a current collector, and was coated thereon using an applicator that had been adjusted to a gap of 250 μm. The paste was dried in a vacuum for one whole day and night at 120° C., and then the aluminum foil was punched to a specimen having a size of φ16 mm and subjected to press compaction at 4 t/cm². This was used as a positive electrode. Immediately before the production of a battery, the positive electrode was dried in a vacuum at 120° C. for 120 min or more, attached moisture was removed, and the positive electrode was incorporated into a battery. Also, the average value of the weight of an aluminum foil specimen having a size of φ16 mm was determined in advance, and the weight of the aluminum foil was subtracted from the weight of the positive electrode to determine the weight of the positive electrode mixture. Furthermore, the content of the positive electrode active material was determined from the mixing ratio of the positive electrode active material, acetylene black, and PVDF.

Figure 1:
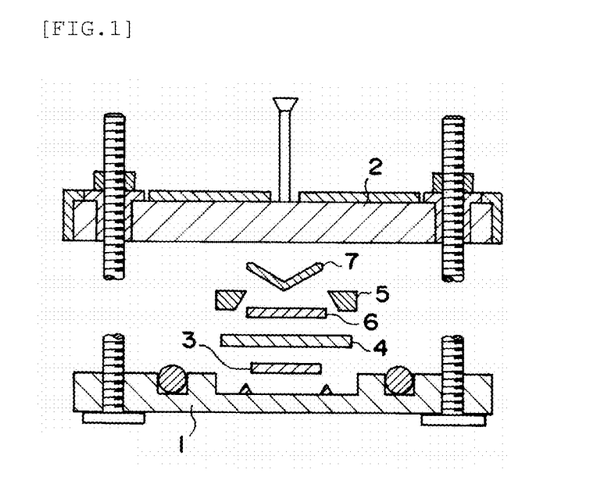
FIG. 1 is a diagram illustrating the structure of a cell for electrochemical evaluation used in the evaluation of battery characteristics in Examples.
Figure 2:
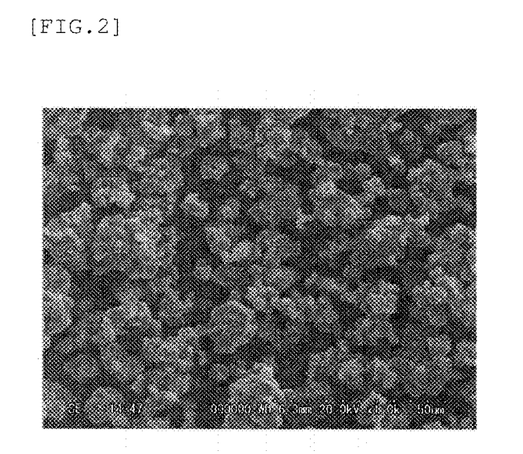
FIG. 2 is a SEM photograph (1000 times) of the spinel type lithium transition metal oxide obtained in Example 1.
Figure 3:
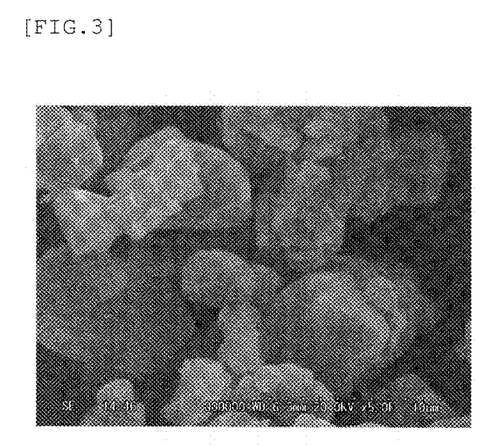
FIG. 3 is a SEM photograph (5000 times) of the spinel type lithium transition metal oxide obtained in Example 1.

A negative electrode was produced from lithium metal with a size of φ20 mm× thickness of 1.0 mm, and a cell for electrochemical evaluation, TOMCEL (registered trademark), illustrated in FIG. 1 was produced using these materials.

In the electrochemical cell of FIG. 1, a positive electrode 3 formed from the positive electrode mixture described above was disposed at the center inside a lower body 1 made of stainless steel having resistance to organic electrolyte. At the upper surface of this positive electrode 3, a separator 4 made of a finely porous polypropylene resin, which was impregnated with an electrolyte liquid, was disposed, and the separator was fixed by a TEFLON (registered trademark) spacer 5. Furthermore, a negative electrode 6 formed of lithium metal was disposed below the separator upper surface, a spacer 7 which also functioned as a negative electrode terminal was disposed, and the assembly was covered thereon with an upper body 2 and then tightened with screws. Thus, the battery was sealed.

For the electrolyte liquid, a mixture of EC and DMC at a volume ratio of 3:7 was used as a solvent, and a solution prepared by dissolving $LiPF_6$ as a solute in this solvent at 1 mol/L was used.

However, for the electrolyte liquids for the 5-V class spinels of Example 17 and Example 18, an electrolyte liquid prepared by dissolving $LiPF_6$ in a carbonate-based mixed solvent at 1 mol/L was used.

(Initial Discharge Capacity)

The initial discharge capacity was determined by the method described below, using an electrochemical cell prepared as described above. That is, while in a state of being charged up to 4.3 V at 0.1 C at 20° C., the current value was calculated from the content of the positive electrode active material in the positive electrode so as to obtain a discharge rate of 0.1 C. The discharge capacity (mAh/g) up to 3.0 V obtainable when the cell was subjected to constant-current discharging was measured. The initial discharge capacities of various Examples and Comparative Example are indicated in the tables as relative values with respect to the initial discharge capacity of Comparative Example 1, which is designated as 100.

However, in the case of the 5-V class spinels of Example 17 and Example 18, while in a state of being charged up to 4.9 V at 0.1 C at 20° C., the current value was calculated from the content of the positive electrode active material in the positive electrode so as to obtain a discharge rate of 0.1 C. The discharge capacity (mAh/g) up to 3.0 V obtainable when the cell was subjected to constant-current discharging was measured.

Furthermore, a high temperature characteristics evaluation was carried out by the following method.

8.80 g of a spinel type lithium transition metal oxide (powder), 0.60 g of acetylene black (manufactured by Denki Kagaku Kogyo K.K.), and 5.0 g of a liquid obtained by dissolving PVDF (manufactured by Kishida Chemical Co., Ltd.) in NMP (N-methylpyrrolidone) at a concentration of 12 wt % were accurately measured, 5 ml of NMP was added thereto, and the mixture was sufficiently mixed to produce a paste. This paste was applied on an aluminum foil as a current collector, and was coated thereon using an applicator that had been adjusted to a gap of 200 µm to 310 µm. The paste was dried in a vacuum for one whole day and night at 120° C., and then the aluminum foil was punched to a specimen having a size of φ16 mm and subjected to press compaction at 4 t/cm². This was used as a positive electrode. Immediately before the production of a battery, the positive electrode was dried in a vacuum at 120° C. for 120 min or more, attached moisture was removed, and the positive electrode was incorporated into a battery. Also, the average value of the weight of an aluminum foil specimen having a size of φ16 mm was determined in advance, and the weight of the aluminum foil was subtracted from the weight of the positive electrode to determine the weight of the positive electrode mixture. Furthermore, the content of the positive electrode active material was determined from the mixing ratio of the positive electrode active material, acetylene black, and PVDF.

A negative electrode was produced from natural spherical graphite (Japan Pionics Co., Ltd., electrode capacity: 1.6 mAh/cm²) with a size of φ17.5 mm, and the negative electrode capacity/positive electrode capacity ratio was adjusted to 1.1 to 1.15. For the electrolyte liquid, a mixture of EC and DMC at a volume ratio of 3:7 added with 0.5% VC was used as a solvent, and a solution prepared by dissolving $LiPF_6$ as a solute in this solvent at 1 mol/L was used. Thus, a cell for electrochemical evaluation, TOMCEL (registered trademark), illustrated in FIG. 1 was produced using these materials.

However, for the electrolyte liquids for the 5-V class spinels of Example 17 and Example 18, an electrolyte liquid prepared by dissolving $LiPF_6$ in a carbonate-based mixed solvent at 1 mol/L was used.

(Initial Activation Treatment)

The electrochemical cells prepared as described above were used to perform a charging-discharging test by the method described below, and thus the cells were subjected to an initial activation treatment. The initial activation treatment is important for lithium ion batteries.

A cell was placed in an environment testing machine set such that the environment temperature for charging and discharging a battery would be 25° C., and the testing machine was prepared to be capable of charging and discharging. The cell was left to stand for one hour so that the cell temperature would reach the environment temperature, and then constant-current constant-voltage charging was carried out by setting the charging-discharging range to 3.0 V to 4.2 V for a lithium manganate powder (sample) (provided that the charging-discharging range in the case of the 5-V class spinels of Example 17 and example 18 was set to 3.0 V to 4.9 V) at a rate of 0.05 C for the first cycle. The cell was subjected to aging for about 50 hours to 100 hours, subsequently constant-current discharging was carried out at 0.05 C, and then two cycles of constant-current constant-voltage charging at 0.1 C and constant-current discharging at 0.1 C were carried out.

(Evaluation of High Temperature Cycle Life)

An electrochemical cell prepared as described above was used to perform a charging-discharging test by the method described below, and the high temperature cycle life characteristics were evaluated.

A cell was placed in an environment testing machine set such that the environment temperature for charging and discharging a battery would be 45° C., and the testing machine was prepared to be capable of charging and discharging. The cell was left to stand for 4 hours so that the cell temperature would reach the environment temperature. Subsequently, the charging-discharging range was set to 3.0 V to 4.2 V for a lithium manganate powder (sample) (provided that the charging-discharging range in the case of the 5-V class spinels of Example 17 and Example 18 was set to 3.0 V to 4.9 V), one charging-discharging cycle was performed by constant-current constant-potential charging at 1.0 C and constant-current discharging at 0.1 C, and 199 charging-discharging cycles were carried out at 1 C with a charge-discharge depth of SOC 0% to 100%. In order to check the capacity of the $200_{th}$ cycle, discharging was performed at a discharging rate of 0.1 C.

The percentage (%) of the numerical value determined by dividing the discharge capacity of the $200_{th}$ cycle by the discharge capacity of the first cycle, was determined as the "capacity retention ratio (%) before and after 200 cycles". The capacity retention ratios before and after 200 cycles of the various Examples and Comparative Example are presented in the tables as relative values with respect to the capacity retention ratio (%) before and after 200 cycles of Comparative Example 1, which is designated as 100.0.

(Power Output Retention Ratio Before and after Cycle)

An electrochemical cell that had been subjected to the initial activation treatment was used to perform a charging-discharging test by the method described below, and the power output retention ratio was determined.

A cell that had been subjected to an initial activation treatment was placed in an environment testing machine set at 25° C., and charging was performed from the discharge capacity obtained by the initial activation treatment, at a SOC of 50%. Subsequently, discharging was performed at 3.0 C for 10 seconds, and the initial power output was determined using an electrochemical measuring device. The cell that had been subjected to cycling at a high temperature (45° C.) was set in an environment test at 25° C., and was charged at a SOC of 50%. Subsequently, discharging was performed at 3.0 C for 10 seconds, and the power output after 200 cycles was determined using an electrochemical measuring device.

The value determined by dividing the power output after 200 cycles by the initial power output was determined as the "power output retention ratio (%)". The power output retention ratios before and after 200 cycles of the various Examples and Comparative Example are presented in the tables as relative values with respect to the power output retention ratio (%) of Comparative Example, which was designated as 100.0.

TABLE 1

|  | Li (mass %) | Mn (mass %) | Al (mass %) | Mg (mass %) | B (mass %) | S (mass %) |
|---|---|---|---|---|---|---|
| Example 1 | 4.2 | 57.2 | 1.2 | 0.1 | 0.01 | <0.01 |
| Example 2 | 4.1 | 56.5 | 1.8 | 0.2 | 0.01 | <0.01 |
| Example 3 | 4.2 | 56.9 | 0.9 | 0.1 | 0.01 | <0.01 |
| Example 4 | 4.2 | 57.4 | 0.9 | 0.2 | 0.01 | <0.01 |

TABLE 1-continued

|  | Li (mass %) | Mn (mass %) | Al (mass %) | Mg (mass %) | B (mass %) | S (mass %) |
|---|---|---|---|---|---|---|
| Example 5 | 4.2 | 56.5 | 1.8 | 0.1 | 0.01 | <0.01 |
| Example 6 | 4.2 | 57.5 | 0.9 | 0 | 0.01 | <0.01 |
| Example 7 | 4.1 | 57.2 | 1.2 | 0 | 0.01 | <0.01 |
| Example 8 | 4.2 | 56.4 | 1.5 | 0.2 | 0.01 | <0.01 |
| Example 9 | 4.2 | 57.2 | 1.2 | 0.1 | 0.01 | <0.01 |
| Example 10 | 4.2 | 56.5 | 1.8 | 0.1 | 0.01 | <0.01 |
| Example 11 | 4.2 | 57.5 | 0.9 | 0 | 0.01 | 0.01 |
| Example 12 | 4.1 | 56.6 | 1.8 | 0.2 | 0.01 | <0.01 |
| Example 13 | 4.2 | 57.4 | 0.9 | 0.3 | 0.02 | 0.03 |
| Example 14 | 4.2 | 57.3 | 0.9 | 0.3 | 0.03 | 0.1 |
| Example 15 | 4.2 | 57.2 | 1.2 | 0.1 | <0.01 | <0.01 |
| Example 16 | 4.2 | 57.4 | 1.2 | 0.1 | <0.01 | <0.01 |
| Comparative Example 1 | 4.1 | 57.2 | 0 | 1.0 | — | 0.36 |

TABLE 2

|  | Li (mass %) | Mn (mass %) | Ni (mass %) | Ti (mass %) | B (mass %) | S (mass %) |
|---|---|---|---|---|---|---|
| Example 17 | 4.1 | 39.2 | 14.5 | 5.2 | 0.15 | 0.03 |
| Example 18 | 4.2 | 38.5 | 14.5 | 5.1 | 0.15 | 0.02 |

TABLE 3

|  | Angle of repose [°] | SSA [m2/g] | KF moisture (25~300° C.) [ppm] | KF moisture (200~300° C.) [ppm] | Amount of magnetic substances [ppb] | Initial discharge capacity Negative electrode: Li/Li+ (mAh/g) | 45° C. high temperature evaluation (Negative electrode: C), Capacity retention ratio before and after 200 cycles | 45° C. high temperature evaluation (Negative electrode: C), Power output retention ratio before and after 200 cycles |
|---|---|---|---|---|---|---|---|---|
| Example 1 | 63 | 0.30 | 195 | 34 | 6 | 103 | 108.0 | 165.9 |
| Example 2 | 59 | 0.29 | 239 | 35 | 49 | 102 | 106.8 | 161.8 |
| Example 3 | 60 | 0.31 | 200 | 33 | 18 | 103 | 107.9 | 166.0 |
| Example 4 | 61 | 0.32 | 183 | 15 | 21 | 103 | 107.9 | 166.5 |
| Example 5 | 60 | 0.33 | 171 | 0 | 15 | 102 | 107.3 | 164.4 |
| Example 6 | 60 | 0.34 | 185 | 25 | 30 | 102 | 107.8 | 161.8 |
| Example 7 | 62 | 0.35 | 187 | 28 | 27 | 103 | 107.0 | 166.6 |
| Example 8 | 58 | 0.24 | 220 | 32 | 33 | 102 | 106.8 | 161.6 |
| Example 9 | 57 | 0.34 | 374 | 115 | 240 | 102 | 104.7 | 160.1 |
| Example 10 | 57 | 0.33 | 270 | 50 | 225 | 102 | 105.7 | 161.4 |
| Example 11 | 57 | 0.35 | 373 | 85 | 231 | 103 | 104.7 | 157.7 |
| Example 12 | 57 | 0.36 | 306 | 60 | 225 | 102 | 104.7 | 159.5 |
| Example 13 | 56 | 0.37 | 392 | 77 | 246 | 103 | 104.7 | 154.5 |
| Example 14 | 54 | 0.40 | 399 | 77 | 246 | 102 | 104.1 | 154.0 |
| Example 15 | 64 | 0.38 | 138 | 20 | 45 | 103 | 108.1 | 165.5 |
| Example 16 | 68 | 0.40 | 140 | 21 | 50 | 102 | 108.1 | 167.7 |
| Example 17 | 51 | 0.14 | 99 | 1 | 210 | 128 | 106.0 | 140.0 |
| Example 18 | 52 | 0.44 | 136 | 15 | 218 | 126 | 109.0 | 150.0 |
| Comparative Example 1 | 40 | 0.62 | 500 | 200 | 500 | 100 | 100.0 | 100.0 |

(Inference)

From the results of this test and the results of tests carried out so far, it was found that in regard to a spinel type (Fd-3 m) lithium transition metal oxide, when the angle of repose is increased, and the amount of moisture (25° C. to 300° C.) measured by the Karl Fischer method is decreased, the life characteristics can be further enhanced. Specifically, from these results of Examples and Comparative Example, it is contemplated that a spinel type (Fd-3 m) lithium transition metal oxide having an angle of repose of 50° to 75° and an amount of moisture (25° C. to 300° C.) measured by the Karl Fischer method of less than 400 ppm is used, the life characteristics can be further enhanced as compared with Comparative Example.

It is speculated that the same also applies to 5-V class spinels.

The invention claimed is:

1. A spinel type lithium manganese transition metal oxide, having an angle of repose of 50° to 75°, and having an amount of moisture (25° C. to 300° C.) measured by the Karl Fischer Method of more than 0 ppm and less than 400 ppm,
wherein the amount of moisture (200° C. to 300° C.) measured by the Karl Fischer Method is 0 ppm or more and less than 150 ppm, and the amount of moisture (200° C. to 300° C.) measured by the Karl Fischer Method is the moisture that is chemically adsorbed to the surface of the lithium manganese transition metal oxide.

2. The spinel type lithium manganese transition metal oxide according to claim 1, which is represented by composition formula: $Li_{1+x}M_{2-x}O_4$, wherein M in the composition formula represents metal elements including Mn, Al and Mg; and x represents 0.01 to 0.09.

3. The spinel type lithium manganese transition metal oxide according to claim 1, which is represented by composition formula: $Li_{1+x}M_{2-x}O_4$, wherein M in the composition formula represents metal elements including three elements of Mn, Al and Mg; and x represents 0.01 to 0.09.

4. The spinel type lithium manganese transition metal oxide according to claim 2, wherein x in the composition formula represents 0.01 to 0.08.

5. The spinel type lithium manganese transition metal oxide according to claim 1, comprising, as constituent elements, Mg at a proportion of more than 0 wt % and less than or equal to 0.3 wt %, and comprising Al at a proportion of 0.4 wt % to 1.8 wt %.

6. The spinel type lithium manganese transition metal oxide according to claim 5, comprising Al at a proportion of 0.9 wt % to 1.8 wt %.

7. The spinel type lithium manganese transition metal oxide according to claim 1, wherein an amount of magnetic substances measured by a measurement method described below is more than 0 ppb and less than 450 ppb:
Method for measuring the amount of magnetic substances:
a 500-cc resinous container with a lid is used, and 500 cc of ion-exchanged water and one cylindrical stirring bar type magnet coated with tetrafluoroethylene, the magnet having a magnetic force in the range of 100 mT to 150 mT when the magnetic force is measured using a TESLA METER Model TM-601 manufactured by Kanetec Co., Ltd., are added to 100 g of the raw material of a positive electrode active material (powder); the mixture is mounted on a rotary rack of a ball mill and is rotated to be slurrified; next, the magnet is taken out and immersed in ion-exchanged water, and any excess powder attached to the magnet is removed in an ultrasonic cleaner; subsequently, the magnet is taken out and immersed in aqua regia, and the magnet is heated at 80° C. for 30 minutes in the aqua regia to dissolve any magnetic substances; the aqua regia in which magnetic substances are dissolved is then analyzed for the amounts of iron, nickel, chromium, and zinc using an ICP emission analyzer, and by designating the total amounts thereof as the amount of magnetic substances, the amount of magnetic substances per weight of the raw material of the positive electrode active material is calculated.

8. The spinel type lithium manganese transition metal oxide according to claim 1, which is represented by composition formula: $Li[Li_aMn_{2-a-b-c}M1_bM2_c]O_{4-\delta}$ wherein M1 in the composition formula represents a metal element including Ni, Co or Fe; M2 in the composition formula represents a metal element including Mg, Ti, Al, Ba, Cr, or Nb; "a" in the composition formula represents 0.00 to 1.0; "b" represents 0.30 to 0.70; "c" is $0.00 \leq c$; and "$\delta$" is $0 \leq \delta$.

9. The spinel type lithium manganese transition metal oxide according to claim 8, comprising a composite oxide phase containing Ni, Mn, and B.

10. The spinel type lithium manganese transition metal oxide according to claim 8, wherein the amount of magnetic substances measured by a measurement method described below is more than 0 ppb and less than 450 ppb:
Method for measuring the amount of magnetic substances:
a 500-cc resinous container with a lid is used, and 500 cc of ion-exchanged water and one cylindrical stirring bar type magnet coated with tetrafluoroethylene, the magnet having a magnetic force in the range of 100 mT to 150 mT when the magnetic force is measured using a TESLA METER Model TM-601 manufactured by Kanetec Co., Ltd., are added to 100 g of a raw material of a positive electrode active material (powder); the mixture is mounted on a rotary rack of a ball mill and is rotated to be slurrified; next, the magnet is taken out and immersed in ion-exchanged water, and any excess powder attached to the magnet is removed in an ultrasonic cleaner; subsequently, the magnet is taken out and immersed in aqua regia, and the magnet is heated at 80° C. for 30 minutes in the aqua regia to dissolve any magnetic substances; the aqua regia in which magnetic substances are dissolved is then analyzed for the amounts of iron, chromium, and zinc using an ICP emission analyzer, and by designating the total amounts thereof as the amount of magnetic substances, the amount of magnetic substances per weight of the raw material of the positive electrode active material is calculated.

11. The spinel type lithium manganese transition metal oxide according to claim 1, wherein the sulfur content is more than 0 wt % and less than 0.3 wt %.

12. The spinel type lithium manganese transition metal oxide according to claim 3, wherein x in the composition formula represents 0.01 to 0.08.

13. The spinel type lithium manganese transition metal oxide according to claim 2, comprising, as constituent elements, Mg at a proportion of more than 0 wt % and less than or equal to 0.3 wt %, and comprising Al at a proportion of 0.4 wt % to 1.8 wt %.

14. The spinel type lithium manganese transition metal oxide according to claim 3, comprising, as constituent elements, Mg at a proportion of more than 0 wt % and less than or equal to 0.3 wt %, and comprising Al at a proportion of 0.4 wt % to 1.8 wt %.

15. The spinel type lithium manganese transition metal oxide according to claim 4, comprising, as constituent elements, Mg at a proportion of more than 0 wt % and less than or equal to 0.3 wt %, and comprising Al at a proportion of 0.4 wt % to 1.8 wt %.

* * * * *